United States Patent
Shirai et al.

(10) Patent No.: US 6,629,371 B1
(45) Date of Patent: Oct. 7, 2003

(54) SURVEYING INSTRUMENT INCORPORATING A MAGNETIC INCREMENTAL ROTARY ENCODER

(75) Inventors: Masami Shirai, Saitama (JP); Katsuhiko Kenjo, Tokyo (JP)

(73) Assignees: Pentax Corporation, Tokyo (JP); Pentax Precision Co., Ltd., Tokyo (JP)

( * ) Notice: Subject to any disclaimer, the term of this patent is extended or adjusted under 35 U.S.C. 154(b) by 0 days.

(21) Appl. No.: 09/692,614

(22) Filed: Oct. 20, 2000

(30) Foreign Application Priority Data

Oct. 22, 1999 (JP) .......................... 11-301116

(51) Int. Cl.[7] .......................................... G01C 15/00
(52) U.S. Cl. ...................... 33/290; 33/1 PT; 33/708; 324/207.21
(58) Field of Search ................. 33/290, 1 PT, 33/1 N, 706, 708, 707, 291, 292; 324/207.21; 341/15

(56) References Cited

U.S. PATENT DOCUMENTS

| | | | | |
|---|---|---|---|---|
| 5,430,374 A | * | 7/1995 | Metz ..................... | 324/207.21 |
| 5,545,985 A | * | 8/1996 | Campbell .............. | 324/207.21 |
| 5,619,132 A | * | 4/1997 | Spies .................... | 324/207.21 |
| 5,711,080 A | * | 1/1998 | Yamada ........................ | 33/292 |
| 5,746,005 A | * | 5/1998 | Steinberg ................... | 33/1 PT |
| 5,949,548 A | * | 9/1999 | Shirai et al. ................. | 33/292 |
| 6,016,605 A | * | 1/2000 | Hecht ......................... | 33/1 PT |
| 6,018,881 A | * | 2/2000 | Spies ........................ | 33/706 |
| 6,119,355 A | * | 9/2000 | Raby ......................... | 33/291 |
| 6,138,367 A | * | 10/2000 | Raby ......................... | 33/290 |
| 6,169,396 B1 | * | 1/2001 | Yokotani et al. ........ | 324/207.21 |
| 6,212,783 B1 | * | 4/2001 | Ott et al. ..................... | 33/1 PT |
| 6,300,758 B1 | * | 10/2001 | Griffen et al. .......... | 324/207.21 |
| 6,304,079 B1 | * | 10/2001 | Kenjo et al. ............ | 324/207.25 |
| 6,323,644 B1 | * | 11/2001 | Taguchi et al. ......... | 324/207.25 |
| 6,354,010 B1 | * | 3/2002 | Shirai ........................... | 33/292 |
| 6,492,806 B2 | * | 12/2002 | Shirai .................... | 324/207.12 |
| 6,550,150 B1 | * | 4/2003 | Shirai .......................... | 33/290 |
| 6,555,809 B2 | * | 4/2003 | Kenjo et al. ........... | 324/207.21 |
| 6,568,093 B2 | * | 5/2003 | Kogiso et al. .............. | 33/1 PT |

FOREIGN PATENT DOCUMENTS

JP          59217106          12/1984

OTHER PUBLICATIONS

"External Magnetic Field Compensating Type Magnetic Encoder," pp. 47–53, by Takahashi et al., draft presented May 21, 1987 with an English Translation.

* cited by examiner

Primary Examiner—Diego Gutierrez
Assistant Examiner—Madeline Gonzalez
(74) Attorney, Agent, or Firm—Greenblum & Bernstein, P.L.C.

(57) ABSTRACT

A surveying instrument which incorporates a magnetic incremental rotary encoder includes a rotary magnetic drum provided on an outer peripheral surface thereof with a multi-pole magnetized layer having a plurality of equally-divided magnetized divisions, a pair of magnetic sensors located on opposite sides of said rotary magnetic drum so that each of said pair of magnetic sensors faces said multi-pole magnetized layer, and at least one magnet, positioned in the vicinity of at least one of said pair of magnetic sensors, for reducing an error in detection of said magnetic incremental rotary encoder.

12 Claims, 9 Drawing Sheets

Phase Difference Adjustment

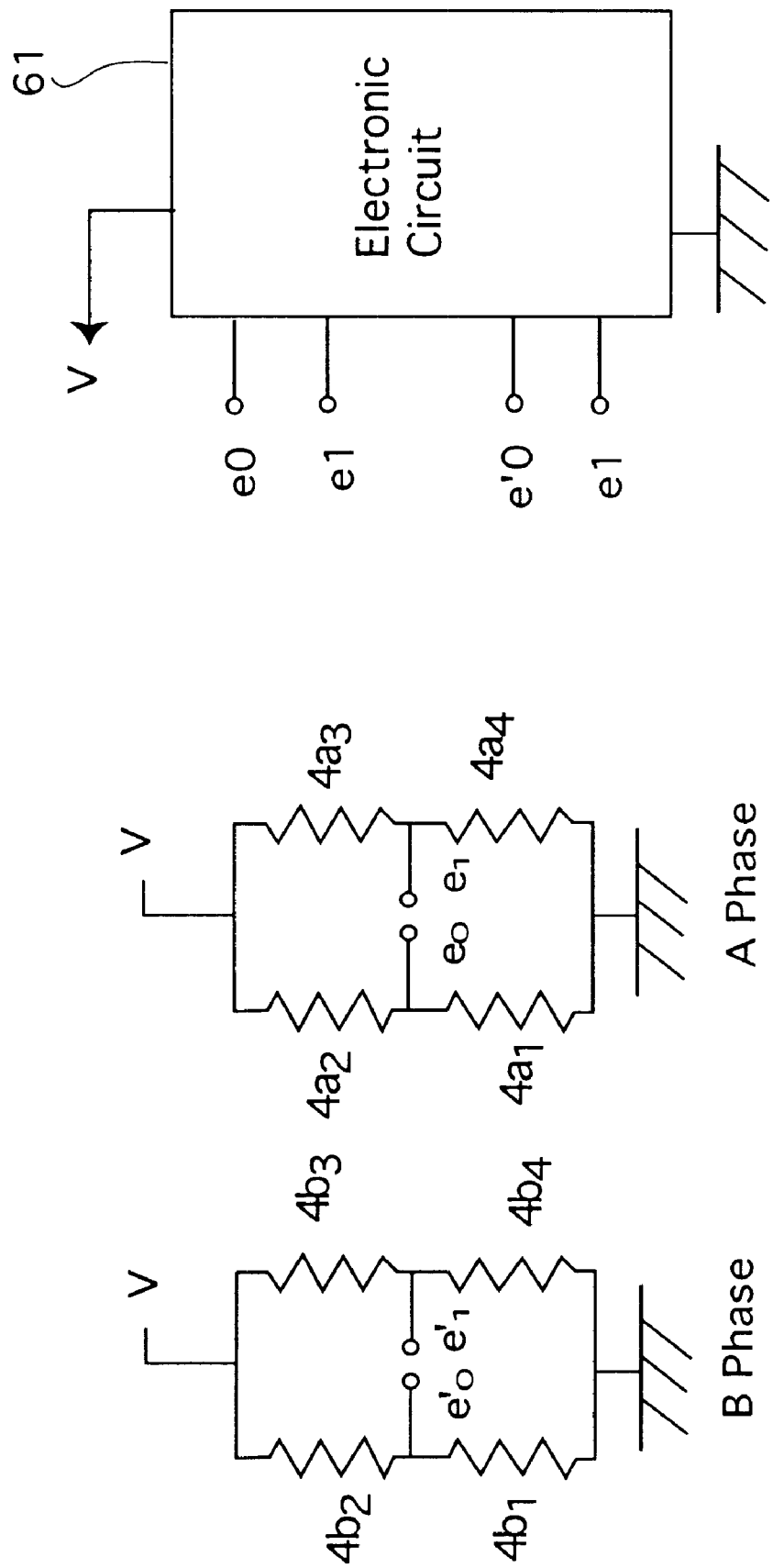

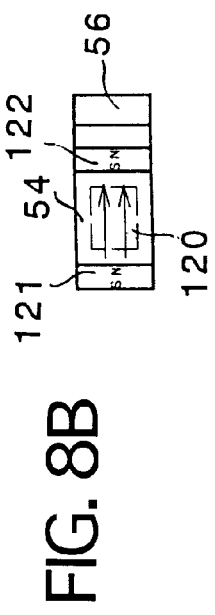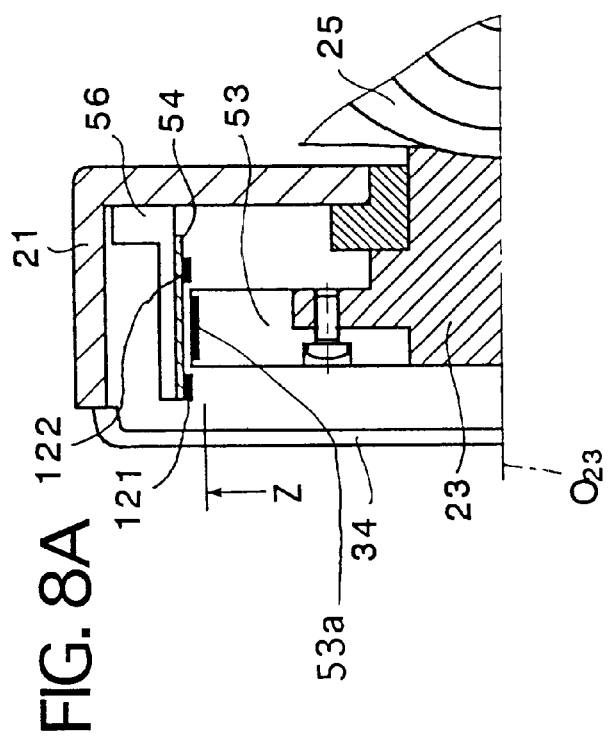
FIG. 7B
FIG. 7A
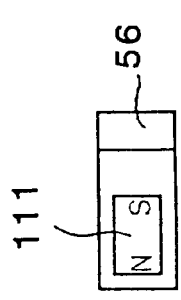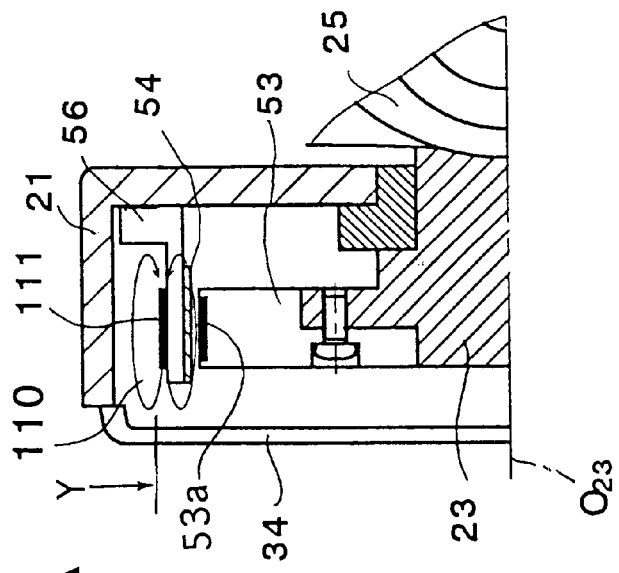
FIG. 8B
FIG. 8A

SURVEYING INSTRUMENT INCORPORATING A MAGNETIC INCREMENTAL ROTARY ENCODER

BACKGROUND OF THE INVENTION

1. Field of the Invention

The present invention relates to a surveying instrument which incorporates a magnetic incremental rotary encoder suitable for surveying instruments such as total stations theodolites or the like.

2. Description of the Related Art

Some conventional surveying instruments such as total stations, theodolites or the like are provided with an incremental rotary encoder as an angle measuring device. Conventionally, an optical incremental rotary encoder is frequently used because it has a high degree of stability and precision.

Similar to an optical incremental rotary encoder, a magnetic incremental rotary encoder is also known as an angle measuring device. A magnetic incremental rotary encoder is generally provided with a magnetic drum (graduator disc) and a magnetic sensor. The magnetic incremental rotary encoder is provided, on an outer peripheral surface of the magnetic drum thereof, with a multi-pole magnetized layer having a plurality of magnetized divisions equally divided by a number of divisions p ("p" being a positive integer). The magnetic sensor is positioned so as to face the multi-pole magnetized layer. This magnetic sensor is provided thereon with, e.g., four magnetoresistor elements which are disposed at equally spaced intervals, whose pitch is smaller than that of the plurality of magnetized divisions of the multi-pole magnetized layer, to detect the variation in the resistance values of the four magnetoresistor elements which vary in accordance with the rotation of the magnetic drum to thereby determine the rotational angle of the magnetic drum with high precision corresponding to the pitch of the plurality of magnetized divisions of the multi-pole magnetized layer. An angle smaller than the pitch is determined according to an interpolative calculation. Since surveying instruments are generally required to have a high degree of precision in their functions, it is desirable to decrease the pitch of the plurality of magnetized divisions of the multi-pole magnetized layer by increasing the number of the magnetized divisions of the multi-pole magnetized layer, so that the number of magnetoresistor elements can be increased.

In magnetic incremental rotary encoders, noise due to a Barkhausen effect occurs. This noise (hereinafter referred to as "Barkhausen noise") is a minute-amplitude noise in a magnetization curve (B-H curve) that occurs with abrupt changes in magnetization occurring due to the movement of the multi-pole magnetized layer (i.e., the rotation of the magnetic drum) within a range wherein a large change in intensity of magnetization occurs in the magnetization curve obtained when a magnetic field is applied to a ferromagnetic medium. As the pitch of the plurality of magnetized divisions of the multi-pole magnetized layer is decreased to increase the number of magnetoresistor elements, Barkhausen noise tends to occur more, which increases an influence on the encoder.

SUMMARY OF THE INVENTION

An object of the present invention is to provide a surveying instrument which incorporates a magnetic incremental rotary encoder and which makes it possible to reduce factors such as Barkhausen noise, which cause detection error, so as to maintain sufficient precision.

To achieve the object mentioned above, according to the present invention, a surveying instrument is provided, which incorporates a magnetic incremental rotary encoder, including a rotary magnetic drum provided on an outer peripheral surface thereof with a multi-pole magnetized layer having a plurality of equally-divided magnetized divisions, at least one magnetic sensor located so as to face the multi-pole magnetized layer, and at least one magnet, positioned in the vicinity of the magnetic sensor, for reducing an error in detection of the magnetic incremental rotary encoder.

Preferably, the at least one magnetic sensor includes a plurality of magnetoresistor elements which are disposed at equally spaced intervals whose pitch is smaller than that of the plurality of equally-divided magnetized divisions.

The above-mentioned error is caused by a noise due to a Barkhausen effect.

In an embodiment, the at least one magnet is a permanent magnet.

Preferably, the at least one magnet is designed and positioned so that primary lines of magnetic force develop substantially parallel to a sensor surface of a corresponding magnetic sensor, and substantially orthogonal to lines of magnetic field of the multi-pole magnetized layer.

In an embodiment, the at least one magnet includes a sheet magnet positioned on the opposite side of a corresponding magnetic sensor with respect to the multi-pole magnetized layer.

In an embodiment, the at least one magnet includes a pair of sheet magnets positioned on a sensor surface of the magnetic sensor on opposite sides of the plurality of magnetoresistor elements.

In an embodiment, the at least one magnet is fixed to a stationary member to which at least one bearing for supporting the rotary magnetic drum is fixed.

In an embodiment, the at least one magnet is fixed to a cover which is attached to a stationary member to which at least one bearing for supporting the rotary magnetic drum is fixed.

In another embodiment, at least one magnet includes a first magnet fixed to a stationary member to which at least one bearing for supporting the rotary magnetic drum is fixed, and a second magnet fixed to a cover attached to the stationary member. The first magnet and the second magnet are positioned on opposite sides of the magnetic sensor.

The surveying instrument can be a total station.

Preferably, the at least one magnetic sensor includes a first magnetic sensor and a second magnetic sensor. The first magnetic sensor and said second magnetic sensor are is provided in the magnetic incremental rotary encoder so that a phase difference of the one magnetic sensor with respect to the other of the pair of magnetic sensors is adjustable.

According to another aspect of the present invention, a surveying instrument is provided, including a leveling board, a pedestal coupled to the leveling board to be rotatable about a vertical axis relative to the leveling board, a collimating telescope coupled to the pedestal to be rotatable about a horizontal axis relative to the pedestal, a horizontal-angle measuring device for measuring an angle of rotation of the pedestal relative to the leveling board, and a vertical-angle measuring device for measuring an angle of rotation of the collimating telescope relative to the pedestal. At least one of the horizontal-angle measuring device and the vertical-angle measuring device includes a magnetic incremental rotary encoder. The magnetic incremental rotary encoder includes a rotary magnetic drum provided on an outer peripheral surface thereof with a multi-pole magnetized layer having a plurality of equally-divided magnetized divisions, a magnetic sensor; and at least one magnet for reducing an error in detection of the magnetic incremental rotary encoder. The magnetic sensor includes a plurality of magnetoresistor elements and is provided so as to face the multi-pole magnetized layer. Furthermore, at least one magnet is positioned in the vicinity of the magnetic sensors.

The present disclosure relates to subject matter contained in Japanese Patent Application No.11-301116 (filed on Oct. 22, 1999) which is expressly incorporated herein by reference in its entirety.

BRIEF DESCRIPTION OF THE DRAWINGS

The present invention will be discussed below in detail with reference to the accompanying drawings, in which:

FIG. 6 is a schematic circuit diagram of an embodiment showing the electrical connection of an electronic circuit with magnetoresistor elements;

FIG. 7A is a cross sectional view of the first embodiment of a magnetic incremental rotary encoder adopted for the vertical-angle measurement of the total station shown in FIG. 1, showing the structure of the magnetic incremental rotary encoder from above the axis of the horizontal shaft thereof;

FIG. 7B is a diagram of an angle and a magnetic sheet which are provided as elements of the magnetic incremental rotary encoder shown in FIG. 7A, showing the structure of the magnetic sheet, as viewed in the direction of an arrow Y shown in FIG. 7A;

FIG. 8A is a cross sectional view of the second embodiment of the magnetic incremental rotary encoder adopted for the vertical-angle measurement of the total station shown in FIG. 1, showing the structure of the magnetic incremental rotary encoder from above the axis of the horizontal shaft thereof;

FIG. 8B is a diagram of an angle and a pair of magnetic sheets which are provided as elements of the magnetic incremental rotary encoder shown in FIG. 8A, showing the structure of the pair of magnetic sheets, as viewed in the direction of an arrow Z shown in FIG. 8A;

DESCRIPTION OF THE PREFERRED EMBODIMENTS

Figure 1:
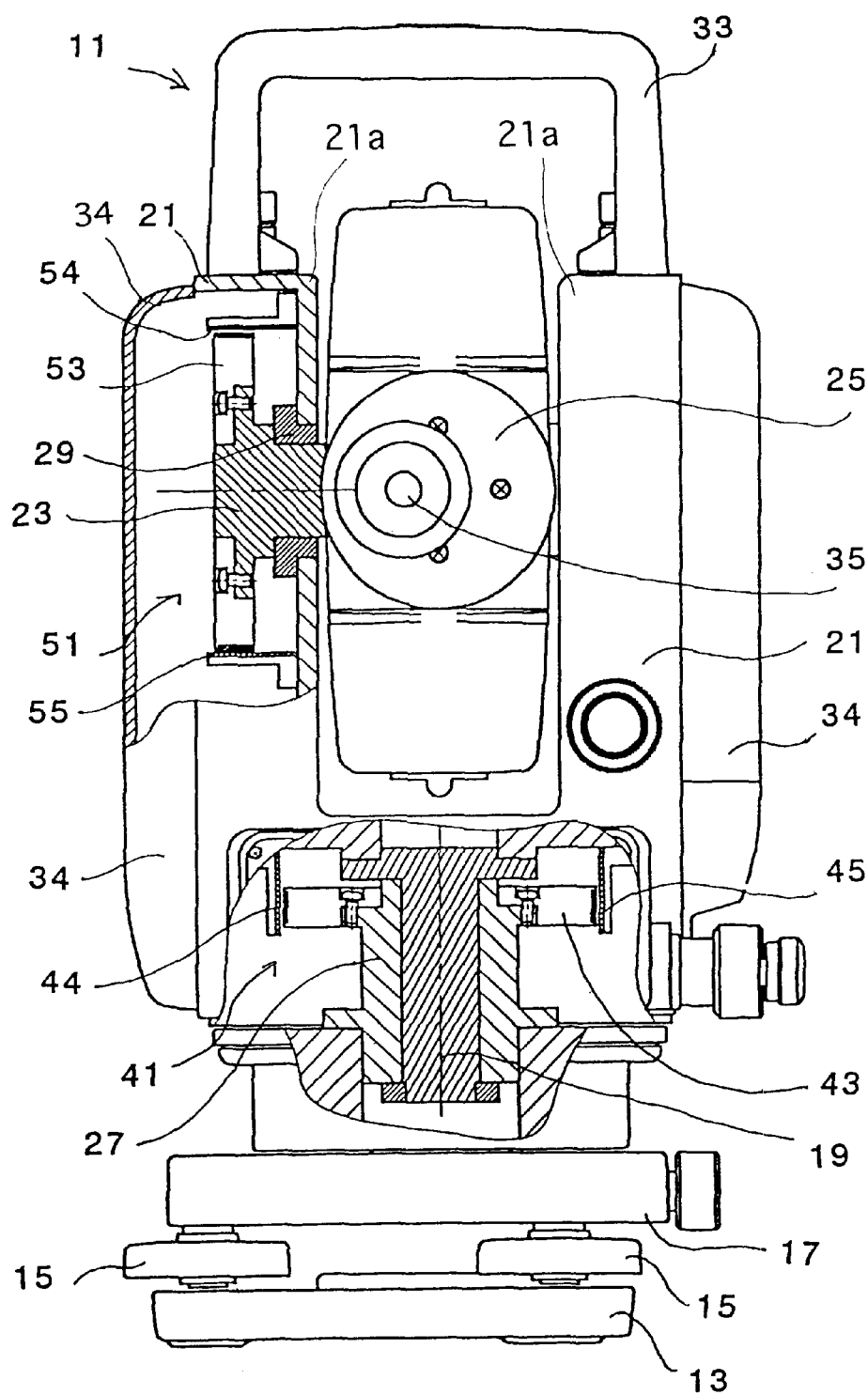
FIG. 1 is a rear elevational view of an embodiment of a total station which incorporates two magnetic incremental rotary encoders to which the present invention is applied, showing fundamental elements of each magnetic incremental rotary encoder in cross section.
Figure 2:
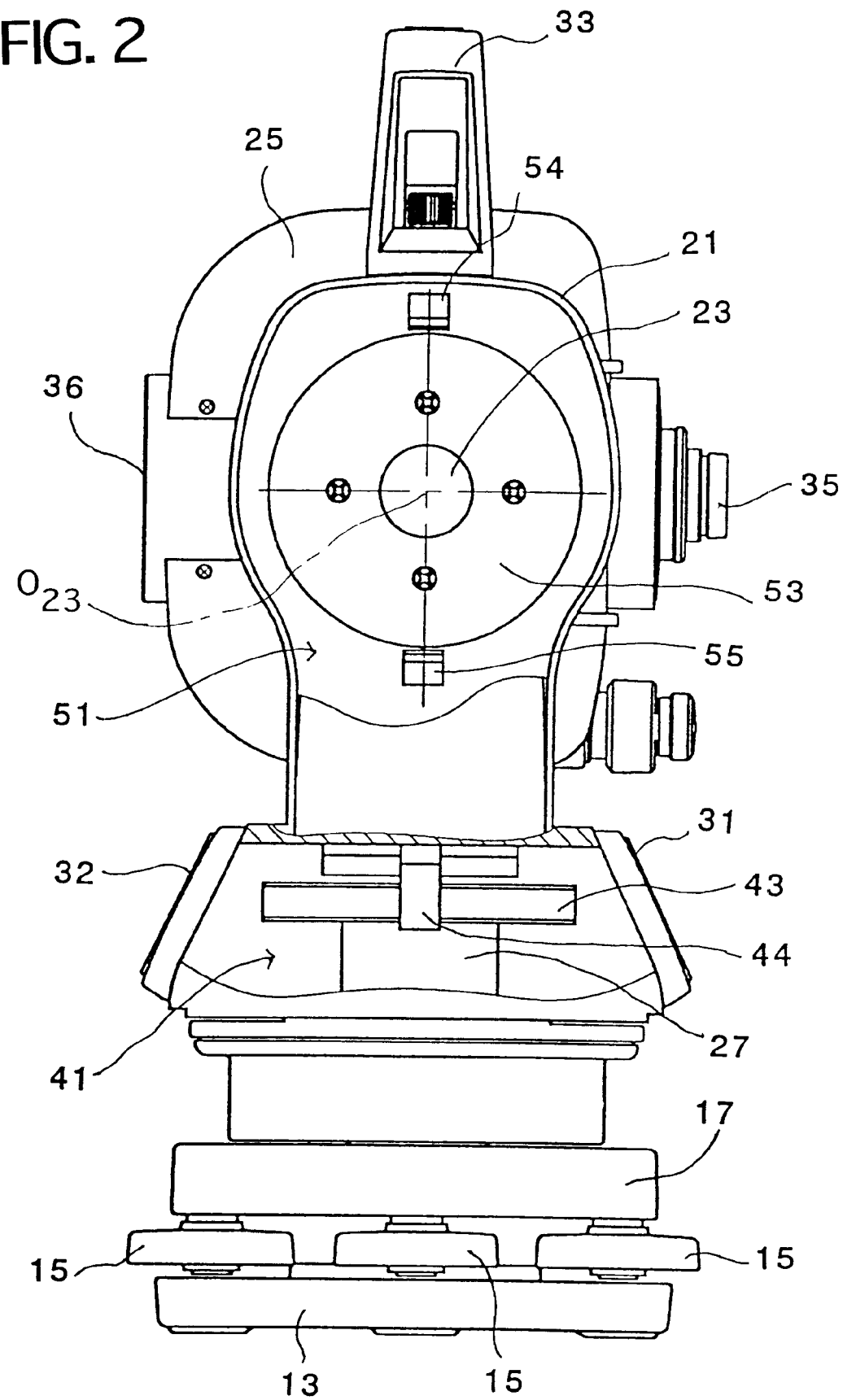
FIG. 2 is a side elevational view of the total station shown in FIG. 1, showing fundamental elements of each magnetic incremental rotary encoder in cross section.

FIGS. 1 and 2 show an embodiment of a total station which incorporates two magnetic incremental rotary encoders to which the present invention is applied.

The total station 11 is provided with a base plate 13, a leveling board 17, a pedestal (body/stationary member) 21 and a collimating telescope 25. The base plate 13 is connected to a tripod (not shown) when the total station 11 is mounted thereon. The base plate 13 is provided thereon with three leveling screws 15 on which the leveling board 17 is mounted. The pedestal 21 is mounted on the leveling board 17 via a vertical shaft 19 to be rotatable about the vertical shaft 19. The pedestal 21 is formed so as to have a general U-shaped cross section, and has a pair of supports 21a positioned on right and left sides as viewed in FIG. 1. The collimating telescope 25 is held by the pair of supports 21a therebetween to be rotatable about the axis of a pair of coaxial horizontal shafts 23 which are respectively fixed to the right and left sides of the collimating telescope 25 as viewed in FIG. 1. The pair of coaxial horizontal shafts 23 are respectively supported by the pair of supports 21a to be rotatable about the axis thereof. In FIG. 1 only one of the pair of coaxial horizontal shafts 23 (the left shaft 23 as viewed in FIG. 1) is shown (in cross section).

The vertical shaft 19 is rotatably fitted in and supported by a vertical bearing 27 which is fixed to the leveling board 17. The base of the pedestal 21 which connects the pair of supports 21a is fixed to the upper end of the vertical shaft 19. Each horizontal shaft 23 is rotatably supported by a corresponding horizontal bearing 29 fixed to the corresponding support 21a. Accordingly, the collimating telescope 25 is supported by the pedestal 21, via the two horizontal shafts 23 and the two horizontal bearings 29, and is rotatable about the vertical shaft 19 and the pair of horizontal shafts 23, which extend perpendicular to each other.

The total station 11 is provided on the vertical shaft 19 with a first magnetic incremental rotary encoder (first rotary encoder/horizontal-angle measuring device) 41 adapted for measuring the angle of rotation (horizontal angle) of the vertical shaft 19 (the pedestal 21 and the collimating telescope 25) with respect to the leveling board 17. The total station 11 is further provided on the horizontal shaft 23 with a second magnetic incremental rotary encoder (second rotary encoder/vertical-angle measuring device) 51 adapted for measuring the angle of rotation (vertical angle) of the horizontal shaft 23 (the collimating telescope 25) with respect to the pedestal 21. The first rotary encoder 41 is provided with a magnetic drum 43 (graduator disc) fixed to the vertical shaft 19. The magnetic drum 43 is provided on the outer peripheral surface thereof with a multi-pole magnetized layer (not shown). The first rotary encoder 41 is further provided with two magnetic sensors 44 and 45 which are positioned to face the multi-pole magnetized layer with a slight gap between each magnetic sensor and the multi-pole magnetized layer on opposite sides of the magnetic drum 43 (the right and left sides of the magnetic drum 43 as viewed in FIG. 1) with respect to the vertical shaft 19. The two magnetic sensors 44 and 45 are offset from each other by approximately 180 degrees about the vertical shaft 19. Likewise, the second rotary encoder 51 is provided with a magnetic drum (graduator disc/rotary magnetic drum) 53 fixed to the horizontal shaft 23. The magnetic drum 53 is provided on the outer peripheral surface thereof with a multi-pole magnetized layer 53a (see FIG. 3) which is identical to the multi pole magnetized layer of the magnetic drum 43. The second rotary encoder 51 is further provided with two magnetic sensors 54 and 55 which are positioned to face the multi pole magnetized layer 53a with a slight gap between each magnetic sensor and the multi-pole magnetized layer 53a on opposite sides of the magnetic drum 53 (the upper and lower sides of the magnetic drum 53 as viewed in FIG. 1) with respect to the horizontal shaft 23. The two magnetic sensors 54 and 55 are offset from each other by approximately 180 degrees about the horizontal shaft 23.

Although the details are not shown in the drawings, the total station 11 is provided in the base of the pedestal 21 with an electronic circuit 61 (see FIG. 6) which includes an operational device for determining the angle of rotation of each of the first and second rotary encoders 41 and 51 (i.e., horizontal and vertical angles) by detecting the output voltage of each of the magnetic sensors 44, 45, 54 and 55. The total station 11 is provided on the front and rear faces of the pedestal 21 with operational panels 31 and 32, respectively (see FIG. 2). Each of the operational panels 31 and 32 is provided thereon with a keyboard which is manually operated by an operator to operate and control the total station 11, and a display (e.g., an LCD panel) for indicating the data input by the keyboard, the measured angles, etc.

As shown in FIGS. 1 and 2, the total station 11 is further provided with a grip 33 which is gripped when the total station 11 is carried, and a protection cover 34 which is attached to the pedestal 21 to cover the same to protect the first rotary encoder 41 and battery (not shown) from dust. The collimating telescope 25 is provided with an objective lens 36 (see FIG. 2) and an eyepiece 35.

Figure 3:
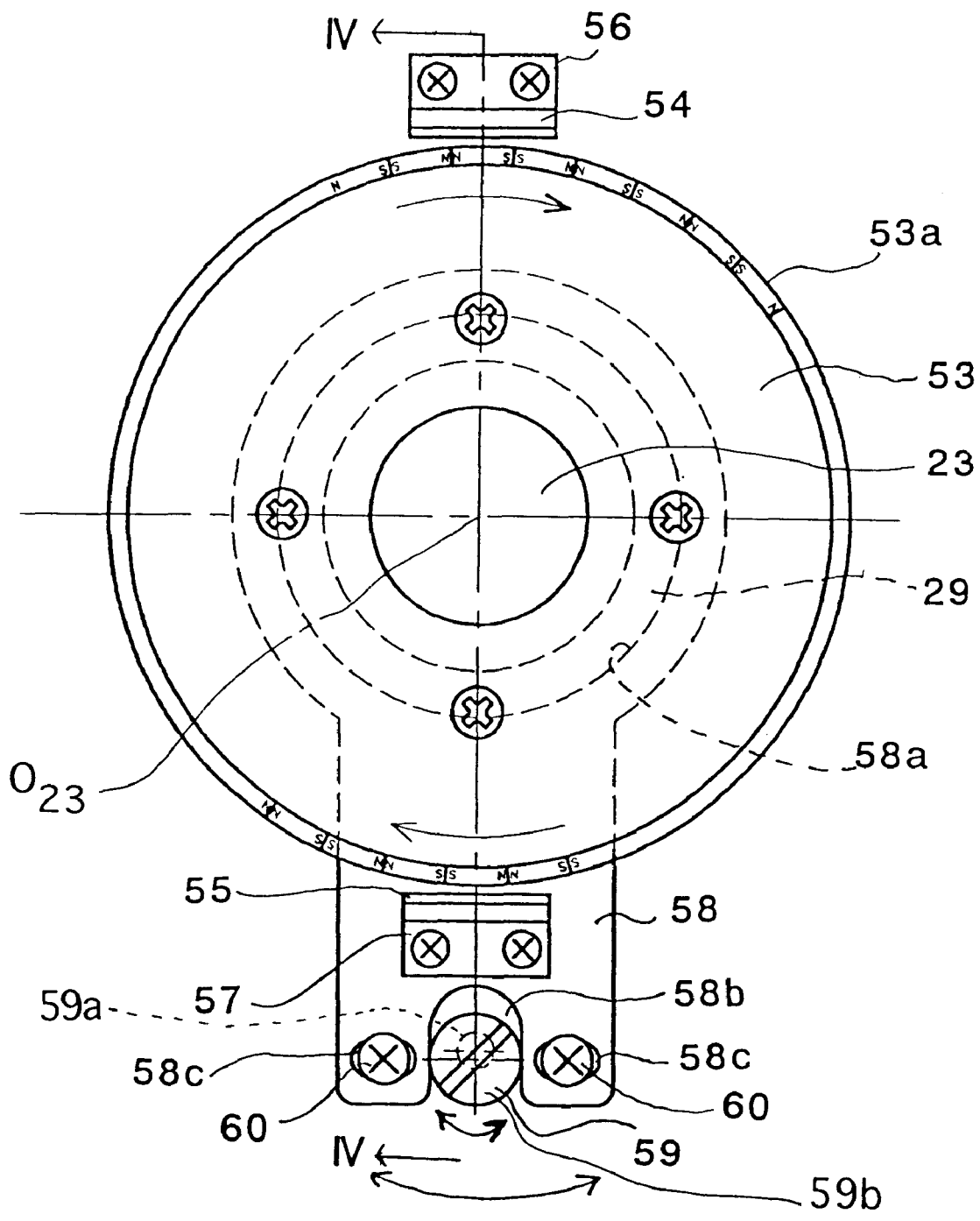
FIG. 3 is a plan view of an embodiment of a magnetic incremental rotary encoder shown in FIGS. 1 and 2.
Figure 4:
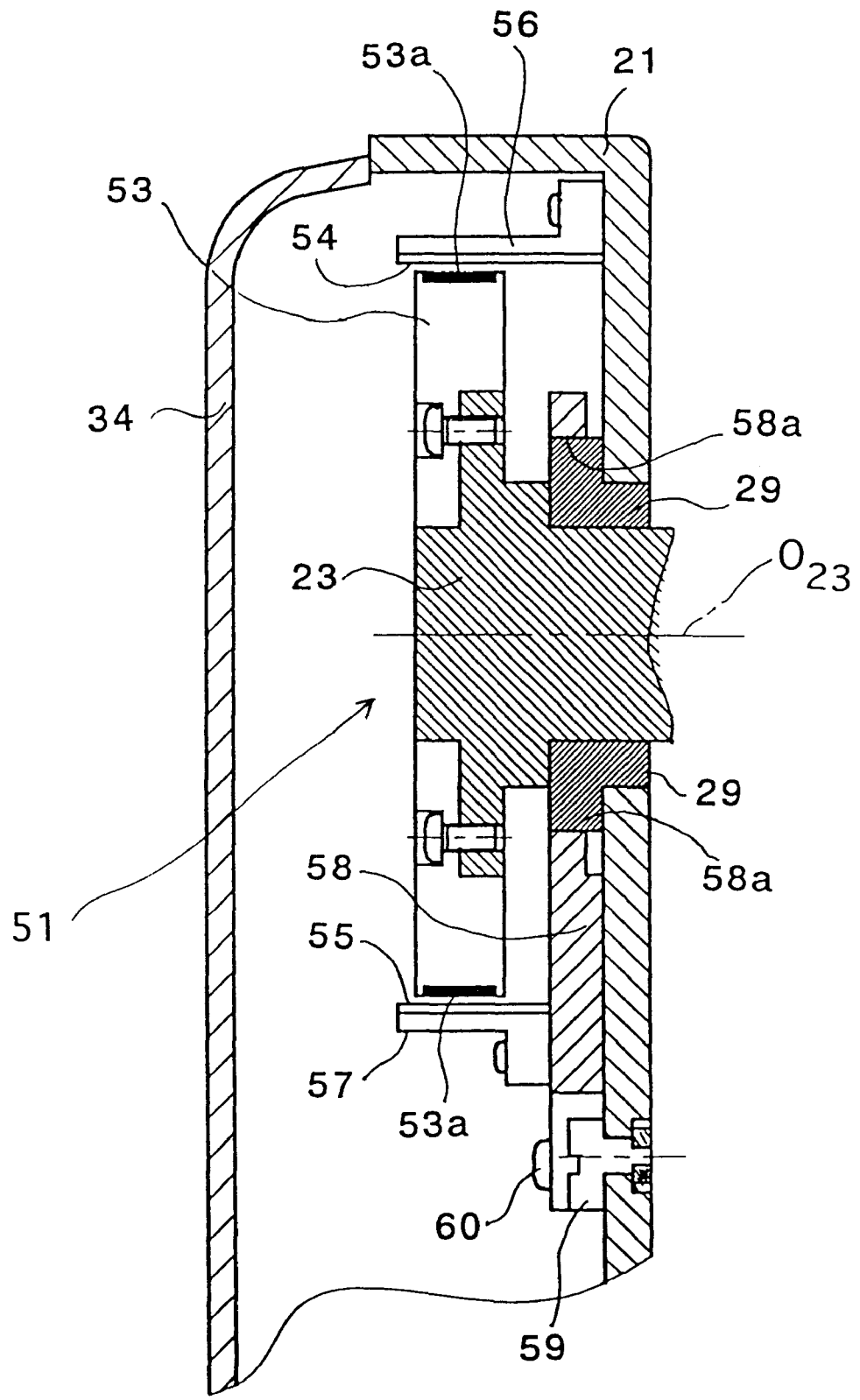
FIG. 4 is a cross sectional view of a magnetic incremental rotary encoder, and peripheral components thereof, shown in FIG. 3 as viewed in the direction of the arrows IV.
Figure 5:
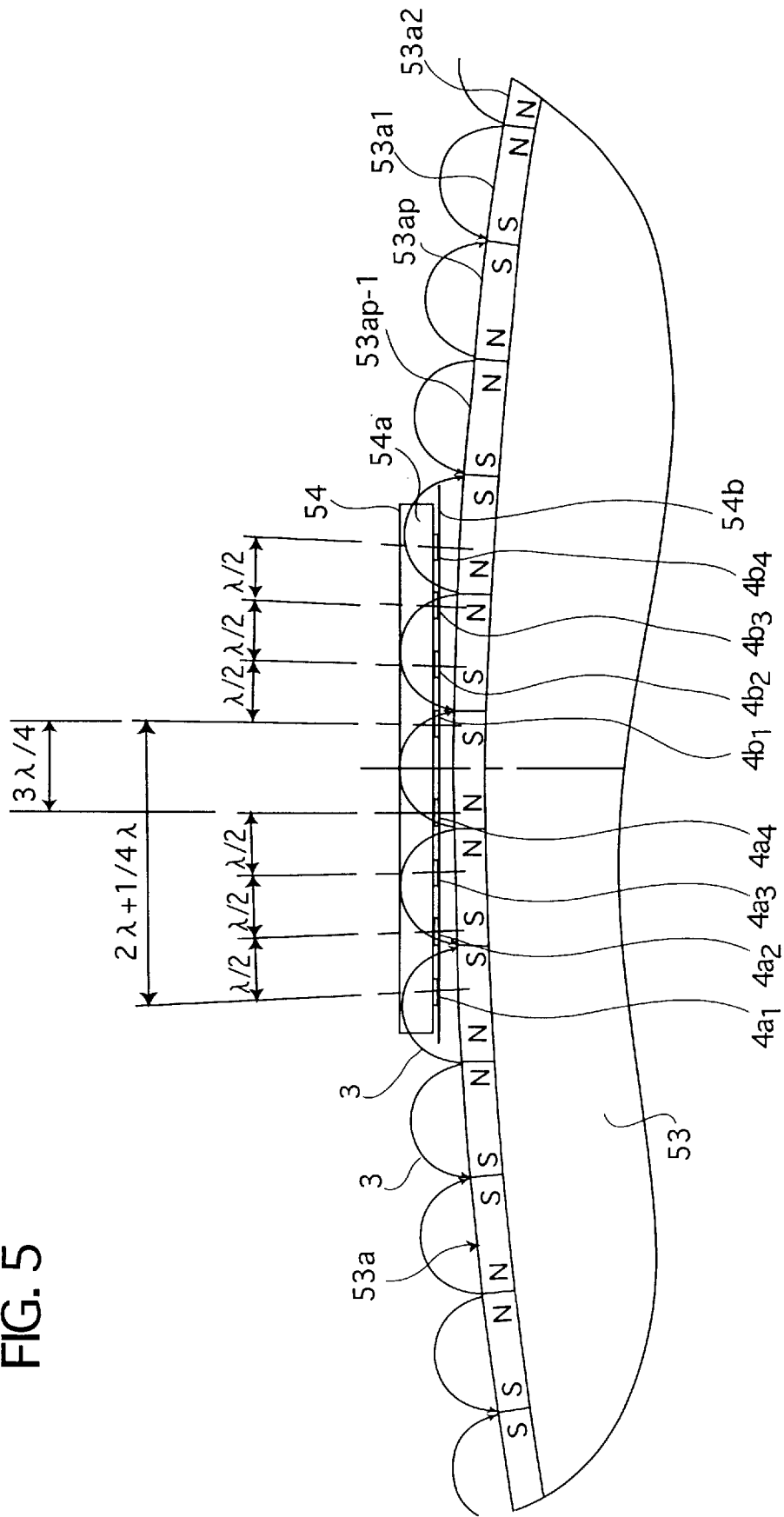
FIG. 5 is an explanatory view of a fundamental portion of the magnetic incremental rotary encoder shown in FIG. 3, showing a relation between a magnetic sensor and the multi-pole magnetized layer of a magnetic drum.

The structure of each of the first and second rotary encoders 41 and 51 will be hereinafter discussed in detail with reference to FIGS. 3, 4 and 5. The fundamental structure of the first rotary encoder 41 is identical to that of the second rotary encoder 51, so that only the structure of the second rotary encoder 51 will be hereinafter discussed in detail. FIG. 3 is an enlarged plan view of the second rotary encoder 51 shown in FIGS. 1 and 2. FIG. 4 is an enlarged cross sectional view of the second rotary encoder and peripheral components thereof shown in FIG. 1. FIG. 5 is an explanatory view of the magnetic sensor 54 and peripheral components thereof shown in FIG. 3, showing a relationship between the multi-pole magnetized layer 53a and the magnetic sensor 54. The first and second magnetic sensors 54 and 55 are fixed to angles 56 and 57, respectively. The first magnetic sensor 54 is fixed to the pedestal 21 via the angle 56, while the second magnetic sensor 56 is fixed to the base plate 58 via the angle 57.

The second rotary encoder 51 is provided, on an outer peripheral surface of the magnetic drum 53 thereof, with the multi-pole magnetized layer 53a having a plurality of magnetized divisions $53a_1$~$53a_p$ equally divided by the number of divisions p ("p" being a positive integer). The pitch (pitch angle) of the magnetized divisions (i.e., the pitch of two adjacent borders of the magnetic poles) of the multi-pole magnetized layer 53a is herein assumed to be "λ". The first magnetic sensor 54 is positioned so as to face the multi-pole magnetized layer 53a with a slight gap between the first magnetic sensor 54 and the multi-pole magnetized layer 53a. The first magnetic sensor 54 is provided with a plane board 54a and eight magnetoresistor elements $4a_1$, $4a_2$, $4a_3$, $4a_4$, $4b_1$, $4b_2$, $4b_3$ and $4b_4$ (FIG. 5). These eight magnetoresistor elements are located on the surface of the plane board 54a which faces the multi-pole magnetized layer 53a so that the straight line which substantially perpendicularly penetrates through the center of each magnetoresistor element passes through the rotational axis of the magnetic drum 53.

The eight magnetoresistor elements $4a_1$, $4a_2$, $4a_3$, $4a_4$, $4b_1$, $4b_2$, $4b_3$ and $4b_4$ are arranged so that the phase of the four magnetoresistor elements $4a_1$, $4a_2$, $4a_3$ and $4a_4$ is shifted λ/4 with respect to the phase of the remaining four magnetoresistor elements $4b_1$, $4b_2$, $4b_3$ and $4b_4$. If the magnetic drum 53 rotates, the second rotary encoder 51 detects the variation of the resistance values of the eight magnetoresistor elements $4a$, $4a_2$, $4a_3$, $4a_4$, $4b$, $4b_2$, $4b_3$ and $4b_4$, which vary in accordance with the variation of the magnetic field 3 generated by the multi-pole magnetized layer 53a, to thereby determine the rotational angle of the magnetic drum 53 at λ/4 pitch. An angle smaller than the pitch (λ/4) is determined according to an interpolative calculation.

As shown in FIG. 5, the eight magnetoresistor elements $4a$, $4a_2$, $4a_3$, $4a_4$, $4b$, $4b_2$, $4b_3$ and $4b_4$ can be divided into two groups, i.e., an A-phase and a B-phase which have a phase difference of λ/4 or 3λ/4 therebetween. The four magnetoresistor elements $4a$, $4a_2$, $4a_3$ and $4a4$ of the A-phase are arranged at λ/2 intervals and the four magnetoresistor elements $4b$, $4b_2$, $4b_3$ and $4b_4$ of the B-phase are also arranged at λ/2 intervals.

As shown in FIG. 6, the four magnetoresistor elements $4a$, $4a_2$, $4a_3$ and $4a_4$ of the A-phase are connected in the form of a bridge circuit, and the four magnetoresistor elements $4b$, $4b_2$, $4b_3$ and $4b_4$ of the B-phase are also connected in the form of a bridge circuit. The electric circuit 61 applies a constant voltage V between the terminals of each of the two bridge circuits. The electric circuit 61 detects a variation of the magnetic field, i.e., a variation of the angle of rotation of the magnetic drum 53 in accordance with the voltage across terminals e0 and e1 of the A-phase and the voltage across terminals e0' and e1' of the B-phase.

According to this illustrated embodiment, the respective resistance values a1, a2, a3 and a4 of the four magnetoresistor elements $4a$, $4a_2$, $4a_3$ and $4a_4$ of the A-phase vary in accordance with the variation of the magnetic field 3 generated by the rotation of the magnetic drum 53, in accordance with the following equations:

$$a1 = R0 + R\sin(p\omega)$$

$$a2 = R0 + R\sin(p\omega + \pi) = R0 - R\sin(p\omega)$$

$$a3 = R0 + R\sin(p\omega + 2\pi) = R0 + R\sin(p\omega)$$

$$a4 = R0 + R\sin(p\omega + 3\pi) = R0 - R\sin(p\omega)$$

wherein "ω" represents the angle of rotation of the magnetic drum 53, "RO" represents the resistance value in the case of no magnetic field, "R" represents the resistance ratio (coefficient), and "p" represents the number of magnetized divisions of the multi-pole magnetized layer 53a.

If the difference in output between the terminals e0 and e1 is amplified, the output of the A-phase can be represented by the following equation:

$$A\text{out}=\alpha\times2\times R\times V/R0\times\sin(p\omega)$$

wherein "Aout" represents the output of the A-phase, and "α" represents the amplification factor.

The magnetoresistor elements $4b$, $4b_2$, $4b_3$ and $4b_4$ of the B-phase are respectively offset from the magnetoresistor elements $4a$, $4a_2$, $4a_3$ and $4a_4$ of the A-phase by $\pi/2$, so that the output of the B-phase can be represented by the following equation:

$$B\text{out}=\alpha\times2\times R\times V/R0\times\cos(p\omega)$$

wherein "Bout" represents the output of the B-phase.

The angle of rotation of the magnetic drum 53 can be determined at a pitch of p/4 by detecting the zero crossing points of the outputs of the A-phase and the B-phase. Accordingly, the detection pitch is four times smaller than (i.e., a quarter of) the number of divisions p to realize a high resolution, so that the detection precision can be made high. In surveying instruments, a detection pitch which is smaller than a quarter of the number of divisions p is sometimes required. To satisfy such a demand, in the illustrated embodiment, the number of divisions (detection pitch) is increased using the following calculation based on the A-phase and the B-phase.

$$\tan^{-1}(A\text{out}/B\text{out})$$

The structure of the second magnetic sensor 55 is identical to the structure of the first magnetic sensor 54. However, the first and second magnetic sensors 54 and 55 are different in that the position of the second magnetic sensor 55 is adjustable to adjust the phase difference. This adjusting mechanism will be hereinafter discussed.

The base plate 58, to which the second magnetic sensor 55 is fixed, is provided at one end thereof (the upper end as viewed in FIG. 3) with a circular hole 58a and is slidably fitted on one of the two horizontal bearings 29 (the left horizontal bearing 29 as viewed in FIG. 1) to be rotatable about the horizontal shaft 23. Namely, the base plate 58 can rotate about an axis $O^{23}$ of the horizontal shaft 23 with the inner peripheral surface of the circular hole 58a snugly fitted onto the outer peripheral surface of the horizontal bearing 29. The base plate 58 is further provided at the other end thereof with two adjusting slots 58c, and a slit 58b positioned between the two adjusting slots 58c. The two adjusting slots 58c are formed to extend along a circle about the axis $O^{23}$ of the horizontal shaft 23. An eccentric pin 59, which includes a rotational shaft 59a and an eccentric disk 59b eccentrically fixed to the rotational shaft 59a, is fixed to the pedestal 21 to be rotatable about the rotational shaft 59a of the eccentric pin 59. The eccentric disk 59b of the eccentric pin 59 is fitted in the slit 58b of the base plate 58. Two set screws 60 are screwed into the pedestal 21 through the two adjusting slots 58c, respectively. Therefore, in a state where the two set screws 60 are loosened, rotating the eccentric pin 59 causes the base plate 58 to rotate (swing) about the axis $O^{23}$ of the horizontal shaft 23 to thereby move the second magnetic sensor 55 on a circle about the axis $O^{23}$ of the horizontal shaft 23 with the gap between the second magnetic sensor 55 and the multi-pole magnetized layer 53a being maintained constant. This makes it possible to adjust the phase of the output voltage of the second magnetic sensor 55. In the adjusting operation of the second magnetic sensor 55, once the second magnetic sensor 55 has been moved to a position at which a desired phase of the output voltage of the second magnetic sensor 55 is obtained, the two set screws 60 are tightened to fix the base plate 58 to the pedestal 21. According to the above described manner, the phase of the output voltage of the second magnetic sensor 55 can be easily adjusted by rotating the eccentric pin 59.

Five embodiments (first through fifth embodiments) of the second rotary encoder 51 according to the present invention which have a function of reducing Barkhausen noise will be hereinafter discussed with reference to FIGS. 7A through 10. Each of FIGS. 7A, 8A, 9 and 10 is a view similar to FIG. 4, showing the structure of the second rotary encoder 51 from above the axis $O^{23}$ of the horizontal shaft 23.

FIGS. 7A and 7B show the first embodiment of the second rotary encoder 51 according to the present invention. The first embodiment of the second rotary encoder 51 is characterized in that the second rotary encoder 51 is provided, on a surface of the angle 56 (on the upper surface of the angle 56 as viewed in FIG. 7A) on the opposite side of the angle 56 with respect to the first magnetic sensor 54, i.e., on the opposite side of the first magnetic sensor 54 with respect to the multi-pole magnetized layer 53a, with a sheet magnet (permanent magnet) 111. The sheet magnet 111 is positioned so that primary lines of magnetic force 110 develop substantially parallel to a sensor surface 54b (see FIG. 5) of the first magnetic sensor 54 and orthogonal to lines of magnetic field 3 of the multi-pole magnetized layer 53a. Namely, in the first embodiment of the second rotary encoder 51, the sheet magnet 111 is fixed to the angle 56 on the opposite side of the angle 56 with respect to the first magnetic sensor 54 so that the sheet magnet 111 extends parallel to the sensor surface 54b, and so that the magnetic poles (north and south poles) of the sheet magnet 111 repulse each other along the axis $O^{23}$ of the horizontal shaft 23. The sheet magnet 111 is fixed to the angle 56 by adhesive or the like. The dimensions of the sheet magnet 111 is determined so as to spread over all the eight magnetoresistor elements $4a$, $4a_2$, $4a_3$, $4a_4$, $4b$, $4b_2$, $4b_3$ and $4b_4$. Due to the arrangement and the dimensions of the sheet magnet 111, the primary lines of magnetic force 110 act on the Barkhausen noise generated by the magnetoresistor elements $4a_1$, $4a_2$, $4a_3$, $4a_4$, $4b_1$, $4b_2$, $4b_3$ and $4b_4$ so as to reduce the noise effectively.

FIG. 8A and 8B show the second embodiment of the second rotary encoder 51 according to the present invention. The second embodiment of the second rotary encoder 51 is characterized in that the second rotary encoder 51 is provided, on the plane board 54a of the first magnetic sensor 54 on opposite sides of the magnetoresistor elements $4a_1$, $4a_2$, $4a_3$, $4a_4$, $4b_1$, $4b_2$, $4b_3$ and $4b_4$ (the right and left sides as viewed in FIG. 8A), with a pair of sheet magnets (permanent magnets) 121 and 122. The pair of sheet magnets 121 and 122 are positioned so that the north pole of one of the pair of sheet magnets faces the south pole of the other sheet magnet, wherein primary lines of magnetic force 120 develop substantially parallel to the sensor surface 54b of the first magnetic sensor 54 and orthogonal to the lines of magnetic field 3 of the multi-pole magnetized layer 53a. Although the pair of sheet magnets 121 and 122 are provided as elements independent of the first magnetic sensor 54 and are fixed to the plane board 54a by adhesive or the like, the pair of sheet magnets 121 and 122 can be formed integral with the first magnetic sensor 54.

Figure 10:
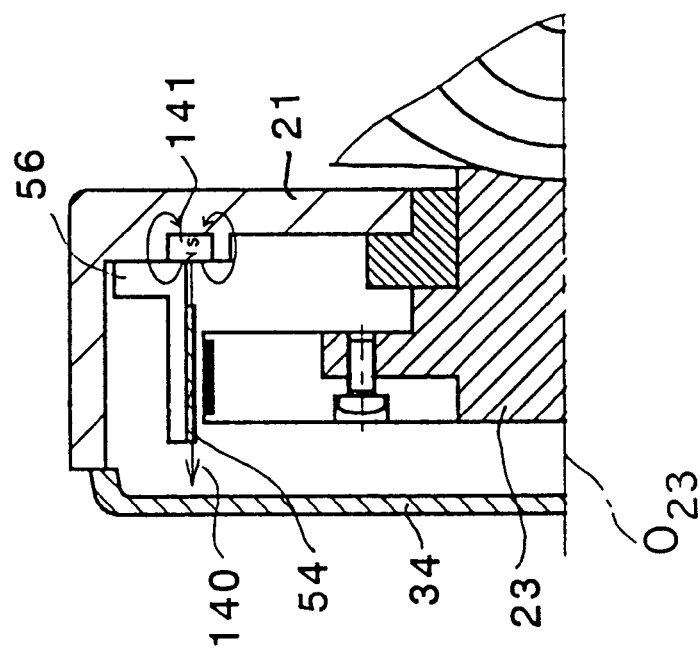
FIG. 10 is a cross sectional view of the fourth embodiment of the magnetic incremental rotary encoder adopted for the vertical-angle measurement of the total station shown in FIG. 1, showing the structure of the magnetic incremental rotary encoder from above the axis of the horizontal shaft thereof.
Figure 9:
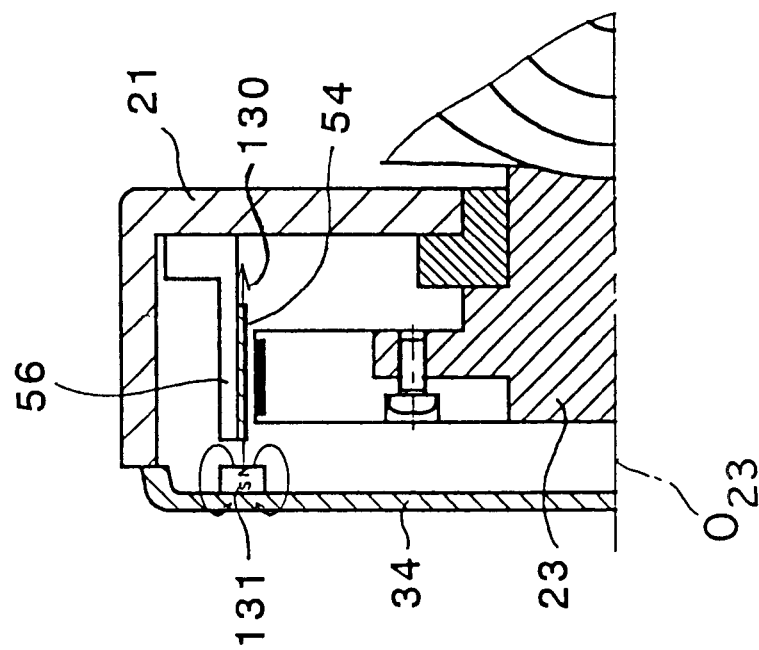
FIG. 9 is a cross sectional view of the third embodiment of the magnetic incremental rotary encoder adopted for the vertical-angle measurement of the total station shown in FIG. 1, showing the structure of the magnetic incremental rotary encoder from above the axis of the horizontal shaft thereof.

FIG. 9 shows the third embodiment of the second rotary encoder 51 according to the present invention, while FIG. 10 shows the fourth embodiment of the second rotary encoder 51 according to the present invention. Each of the third and fourth embodiments of the second rotary encoder 51 is characterized in that a permanent magnet is fixed to the protection cover 34 in the third embodiment, and a permanent magnet is fixed to the pedestal 21 in the fourth embodiment. Although each of the above first and second embodiments is characterized in that the sheet-shaped permanent magnet or magnets are used, and that the sheet magnet or magnets are fixed to the angle 56 or the first magnetic sensor 54, the permanent magnet used does not have to be in the shape of a sheet in each of the third and fourth embodiments. Furthermore, the permanent magnet is fixed not to the angle 56 or the first magnetic sensor 54 but to the protection cover 34 or the pedestal 21 to which the angle 56 or the first magnetic sensor 54 is fixed.

In the third embodiment shown in FIG. 9, a bar magnet 131 is fixed to an inner surface of the protection cover 34. The protection cover 34 can be detached from the pedestal 21, so that in a state where the protection cover 34 is properly attached to the pedestal 21, the bar magnet 131 is positioned so that primary lines of magnetic force 130 develop substantially parallel to the sensor surface 54b of the first magnetic sensor 54 and orthogonal to the lines of magnetic field 3 of the multi-pole magnetized layer 53a.

In the fourth embodiment shown in FIG. 10, a bar magnet 141 is fitted snugly in a recess formed on the pedestal 21. The bar magnet 141 is positioned so that primary lines of magnetic force 140 develop substantially parallel to the sensor surface 54b of the first magnetic sensor 54 and orthogonal to the lines of magnetic field 3 of the multi-pole magnetized layer 53a.

Figure 11:
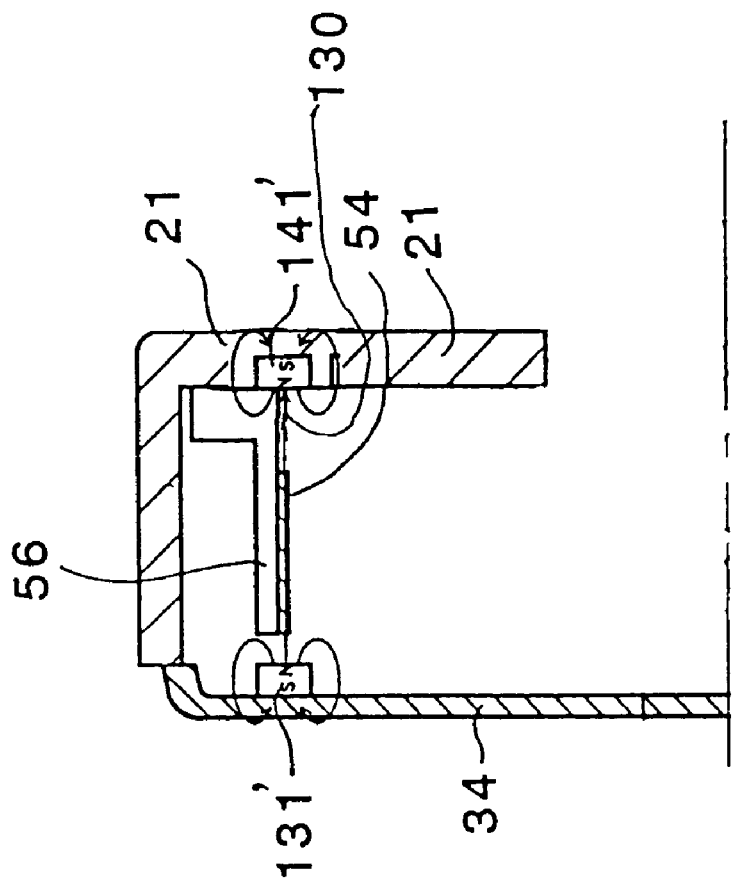
FIG. 11 is a cross sectional view of the fifth embodiment of the magnetic incremental rotary encoder adopted for the vertical-angle measurement of the total station shown in FIG. 1, showing the structure of the magnetic incremental rotary encoder from above the axis of the horizontal shaft thereof.

In a fifth embodiment shown in FIG. 11, a bar magnet 131' corresponding to the bar magnet 131 shown in FIG. 9 is fixed to an inner surface of the protection cover 34 in a manner similar to that of the third embodiment, and at the same time, another bar magnet 141' corresponding to the bar magnet 141 shown in FIG. 10 is fitted snugly in a recess formed on the pedestal 21 in a manner similar to that of the fourth embodiment. In this embodiment, since the bar magnets 131' and 141' are positioned to face each other on opposite sides of the first magnetic sensor 54, if the two bar magnets are positioned so that the north pole of one of the two bar magnets faces the south pole of the other bar magnet, lines of magnetic force are generated more stably than the case of the third or fourth embodiment.

In each of the first through fifth embodiments, although one or two permanent magnets for reducing Barkhausen noise are provided for only one of the four magnetic sensors 44, 45, 54 and 55 disposed in the total station 11, i.e., the first magnetic sensor 54, the same permanent magnet or magnets can be provided for any other magnetic sensor of the magnetic sensors 44, 45 and 55. However, the same permanent magnet or magnets are preferably provided for each of the remaining magnetic sensors 44, 45 and 55. In this case, the first or second embodiment is preferably adopted for each of the magnetic sensors 45 and 55 whose position is adjustable because the magnetic sensors 45 and 55 move together with the magnetic sensor 44 and 54, respectively.

In each of the above illustrated embodiments, it has been noted that providing a permanent magnet or magnets yields an effect of reducing Barkhausen noise. However, there is another effect in each of the above illustrated embodiments wherein a magnetic field is applied to the magnetic sensor (44, 45, 54 or 55); namely, that the roundness of the Lessajous's figure which can be seen from the outputs of the A-phase and the B-phase on a cathode-ray oscilloscope improves. The closer the shape of the Lessajous's figure is to a real circle, the better the reliability of the interpolation operation. However, if a strong magnetic field is applied to the magnetic sensor, it is sometimes the case that the magnetic sensor becomes sensitive to noise since the values of the outputs of the A-phase and the B-phase become small. Therefore, it is preferable that a magnetic field of approximately 0.5~10 gauss be applied to the magnetic sensor.

Although a permanent magnet or magnets are used to apply a magnetic field to the magnetic sensor in the above illustrated embodiments, an electromagnet or electromagnets can be used instead. In this case, it is possible to supply power to the electromagnet or electromagnets only at the time of measuring the horizontal or vertical angle.

The present invention can be applied not only to a total station like each of the above illustrated embodiments, but also to any other surveying instrument such as levels, transits, theodolites, or the like.

As can be understood from the foregoing, according to a surveying instrument which incorporates a magnetic incremental rotary encoder to which the present invention is applied, since at least one magnet for reducing an error in detection of the magnetic incremental rotary encoder is positioned in the vicinity of at least one of a pair of magnetic sensors, even a minute angle of rotation of the magnetic drum can be detected with a high degree of precision even if the surveying instrument is in an external magnetic field.

If each magnet is formed as a sheet magnet and fixedly positioned on the opposite side of the corresponding magnetic sensor with respect to the multi-pole magnetized layer or on the sensor surface of the corresponding magnetic sensor, the magnet is installed in the surveying instrument together with the corresponding magnetic sensor, which reduces the time taken to adjust the position of the magnet with respect to the corresponding magnetic sensor.

If each magnet is fixed to the body (pedestal) of the surveying instrument, to which at least one bearing for supporting the rotary magnetic drum is fixed, or to a cover attached to the body of the surveying instrument, the degree of freedom in size and shape of the magnet increases. This makes it possible to use a large magnet having a high magnetic force, so that a predetermined weak magnetic field can be applied to the magnetic sensor from a distant location to thereby reduce Barkhausen noise more effectively.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A surveying instrument which incorporates a magnetic incremental rotary encoder, comprising:
   a rotary magnetic drum having, on an outer peripheral surface, a multi-pole magnetized layer having a plurality of equally-divided magnetized divisions;
   at least one magnetic sensor located so as to face said multi-pole magnetized layer; and
   at least one magnet, positioned in the vicinity of said at least one magnetic sensor, said at least one magnet being configured to reduce an error in detection of said magnetic incremental rotary encoder;
   wherein said at least one magnet is configured and positioned so that primary lines of magnetic force develop substantially parallel to a sensor surface of a corresponding magnetic sensor, and substantially orthogonal to lines of a magnetic field of said multi-pole magnetized layer.

2. The surveying instrument according to claim 1, wherein said at least one magnetic sensor comprises a plurality of magnetoresistor elements which are disposed at equally spaced intervals whose pitch is smaller than that of said plurality of equally-divided magnetized divisions.

3. The surveying instrument according to claim 1, wherein said error is caused by a noise due to a Barkhausen effect.

4. The surveying instrument according to claim 1, wherein said at least one magnet is a permanent magnet.

5. The surveying instrument according to claim 1, wherein said at least one magnet comprises a sheet magnet positioned on the opposite side of a corresponding magnetic sensor with respect to said multi-pole magnetized layer.

6. The surveying instrument according to claim 1, wherein said at least one magnet comprises a pair of sheet magnets positioned on a sensor surface of said magnetic sensor on opposite sides of said plurality of magnetoresistor elements.

7. The surveying instrument according to claim 1, wherein said at least one magnet is fixed to a stationary member to which at least one bearing for supporting said rotary magnetic drum is fixed.

8. The surveying instrument according to claim 1, wherein said at least one magnet is fixed to a cover which is attached to a stationary member to which at least one bearing for supporting said rotary magnetic drum is fixed.

9. The surveying instrument according to claim 1, wherein said at least one magnet comprises:
   a first magnet fixed to a stationary member to which at least one bearing for supporting said rotary magnetic drum is fixed; and
   a second magnet fixed to a cover attached to said stationary member,
   wherein said first magnet and said second magnet are positioned on opposite sides of said magnetic sensor.

10. The surveying instrument according to claim 1, wherein said surveying instrument is a total station.

11. The surveying instrument according to claim 1, wherein said at least one magnetic sensor comprises a first magnetic sensor and a second magnetic sensor;
   said first magnetic sensor and said second magnetic sensor are provided in said magnetic incremental rotary encoder so that a phase difference of said first magnetic sensor with respect to said second magnetic sensors is adjustable.

12. A surveying instrument comprising:

a leveling board;

a pedestal coupled to said leveling board to be rotatable about a vertical axis relative to said leveling board;

a collimating telescope coupled to said pedestal to be rotatable about a horizontal axis relative to said pedestal;

a horizontal-angle measuring device for measuring an angle of rotation of said pedestal relative to said leveling board; and a vertical-angle measuring device for measuring an angle of rotation of said collimating telescope relative to said pedestal, wherein at least one of said horizontal-angle measuring device and said vertical-angle measuring device comprises a magnetic incremental rotary encoder, wherein said magnetic incremental rotary encoder comprises a rotary magnetic drum having, on an outer peripheral surface, a multi-pole magnetized layer having a plurality of equally-divided magnetized divisions; at least one magnetic sensor; and at least one magnet, positioned in the vicinity of said at least one magnetic sensor, said at least one magnet being configured to reduce an error in detection of said magnetic incremental rotary encoder;

wherein said at least one magnetic sensor comprises a plurality of magnetoresistor elements and is positioned so as to face said multi-pole magnetized layer; and wherein said at least one magnet is configured and positioned so that primary lines of magnetic force develop substantially parallel to a sensor surface of a corresponding magnetic sensor, and substantially orthogonal to lines of a magnetic field of said multi-pole magnetized layer.

* * * * *